US012769265B2

(12) United States Patent
Jacob et al.

(10) Patent No.: US 12,769,265 B2
(45) Date of Patent: Oct. 20, 2026

(54) METHOD FOR CONTROLLING A PARTICLE-FORMING FLUIDIZATION PROCESS TAKING PLACE IN A FLUIDIZATION APPARATUS

(71) Applicant: Glatt Ingenieurtechnik Gesellschaft mit beschränkter Haftung, Weimar (DE)

(72) Inventors: Michael Jacob, Weimar (DE); Marcel Voisin, Weimar (DE)

(73) Assignee: Glatt Ingenieurtechnik Gesellschaft mit beschränkter Haftung, Weimar (DE)

( * ) Notice: Subject to any disclaimer, the term of this patent is extended or adjusted under 35 U.S.C. 154(b) by 252 days.

(21) Appl. No.: 18/835,390

(22) PCT Filed: Feb. 2, 2023

(86) PCT No.: PCT/EP2023/052494
§ 371 (c)(1),
(2) Date: Aug. 2, 2024

(87) PCT Pub. No.: WO2023/148241
PCT Pub. Date: Aug. 10, 2023

(65) Prior Publication Data

US 2025/0138493 A1 May 1, 2025

(30) Foreign Application Priority Data

Feb. 4, 2022 (DE) ..................... 10 2022 201 207.0

(51) Int. Cl.
*G05B 13/04* (2006.01)
*B01J 2/04* (2006.01)

(52) U.S. Cl.
CPC .............. *G05B 13/042* (2013.01); *B01J 2/04* (2013.01)

(58) Field of Classification Search
CPC ...... G05B 13/042; G05B 13/04; G05B 17/02; B01J 2/04
See application file for complete search history.

(56) References Cited

U.S. PATENT DOCUMENTS 4,428,203 A * 1/1984 Carson .................. B01D 3/322 203/DIG. 20
5,536,299 A * 7/1996 Girard ................ B01D 53/0476 95/103

(Continued)

FOREIGN PATENT DOCUMENTS

DE 10341762 A1 * 4/2004 ........... G05B 13/048
DE 102005004632 B3 5/2006

(Continued)

OTHER PUBLICATIONS

Abbasi et al., "A review on modeling and control of olefin polymerization in fluidized-bed reactors", Reviews in Chemical Engineering, 2019, pp. 311-333, vol. 35, Issue 3.

*Primary Examiner* — Kenneth M Lo
(74) *Attorney, Agent, or Firm* — The Webb Law Firm

(57) ABSTRACT

A method for controlling a particle-forming fluidization process taking place in a fluidization apparatus with regard to at least one product property of a process material. In a process cycle, a plurality of process parameters of the fluidization process are determined at a first time, which are forwarded as process parameter actual values to a control device having a control functionality. A process model product property value for a second time subsequent to the first time is calculated in the control device using the process parameter actual values on the basis of a process model stored for the at least one product property. A plurality of optimization parameter sets is generated in the control device from a plurality of process parameter optimization values provided, using which a plurality of optimization (Continued)

forecast values is calculated at a third time by means of an optimization model.

20 Claims, 4 Drawing Sheets

(56) References Cited

U.S. PATENT DOCUMENTS

| | | | |
|---|---|---|---|
| 6,253,113 B1 | 6/2001 | Lu | |
| 6,718,234 B1 | 4/2004 | Demoro et al. | |
| 6,917,838 B2 | 7/2005 | Kruger et al. | |
| 2009/0287320 A1 | 11/2009 | MacGregor et al. | |
| 2012/0173002 A1 | 7/2012 | Zipplies et al. | |
| 2023/0347307 A1 | 11/2023 | Thies | |
| 2024/0047875 A1* | 2/2024 | Pace | G01S 3/043 |
| 2025/0099933 A1* | 3/2025 | Mort | B05C 19/02 |

FOREIGN PATENT DOCUMENTS

| | | | | | |
|---|---|---|---|---|---|
| DE | 102005004632 | | * | 6/2021 | |
| DE | 102020208204 | B3 | | 6/2021 | |
| EP | 1267229 | A2 | | 5/2002 | |
| EP | 1141789 | B1 | | 7/2003 | |
| EP | 1267229 | B1 | * | 12/2007 | G05B 17/02 |
| JP | H1106103 | A | | 4/1989 | |
| JP | 7138017 | A | | 5/1995 | |
| JP | 10128098 | A | | 5/1998 | |
| JP | H10151336 | A | | 6/1998 | |
| JP | 2002132302 | A | | 5/2002 | |
| WO | WO-2011032918 | A1 | * | 3/2011 | B01J 19/0033 |
| WO | 2015067758 | A1 | | 5/2015 | |

* cited by examiner

METHOD FOR CONTROLLING A PARTICLE-FORMING FLUIDIZATION PROCESS TAKING PLACE IN A FLUIDIZATION APPARATUS

CROSS-REFERENCE TO RELATED APPLICATIONS

This application is the United States national phase of International Patent Application No. PCT/EP2023/052494 filed Feb. 2, 2023, and claims priority to German Patent Application No. 10 2022 201 207.0 filed Feb. 4, 2022, the disclosures of which are hereby incorporated by reference in their entireties.

BACKGROUND

Field

The invention relates to a method for controlling a particle-forming fluidization process taking place in a fluidization apparatus with regard to at least one product property (w) of a process material.

Description of Related Art

According to the state of the art, which has not been documented in printed form, particle-forming fluidization processes are usually run using process parameter sets, so-called "recipes". The process parameter sets have process parameters that lead to the desired product properties if a predetermined sequence of process parameters is adhered to, so that the fluidization process always follows the same time sequence.

Furthermore, typical product properties, such as the absolute moisture of the particles, can be adjusted by controlling a process parameter, such as the drying gas temperature or the volume flow of the drying gas. A corresponding method for treating particulate process material in a fluidizing apparatus and the corresponding fluidizing apparatus are disclosed in German patent application DE 10 2020 208 204 B3.

Despite approaching the desired target value with regard to the product property to be controlled, the known methods still have deviations in this respect that negatively affect the product quality of the process material.

SUMMARY

The task of the invention is therefore to develop an improved method for controlling the particle-forming fluidization process taking place in the fluidizing apparatus, which further optimizes the product properties of the process material with regard to the target values.

This task is solved in a method of the type mentioned at the beginning in that in a process cycle a plurality of process parameters of the fluidization process are determined at a first time, which are forwarded as process parameter actual values to a control device having a control functionality, wherein a process model product property value for a second time subsequent to the first time is calculated in the control device using the process parameter actual values on the basis of a process model stored for the at least one product property, and wherein a plurality of optimization parameter sets is generated in the control device from a plurality of process parameter optimization values provided, using which a plurality of optimization forecast values is calculated at a third time by means of an optimization model, wherein a correction value is added to each of the optimization forecast values to form a corrected optimization forecast value, and wherein an optimization difference value is calculated at a third time from a comparison between each of the corrected optimization forecast values and a forecast target value for the at least one product property determined at the third time from a target value function stored in the control device, and wherein subsequently the process parameter optimization values of the optimization parameter set associated with the smallest absolute value of the optimization difference value are each output as a command variable for the second time subsequent to the first time. Advantageously, the method for controlling a particle-forming fluidization process taking place in a fluidizing apparatus determines, without user specifications, suitable command variables for achieving the at least one product property of the process material to be controlled. This significantly increases the product quality of the process material with a high reproducibility of the results.

In this respect, a plurality of process cycles run one after the other, the second time of the process cycle in each case becoming the first time of the subsequent process cycle. Expediently, for example, the values of the second time in the first process cycle become the values of the first time of the second process cycle.

The process parameters will be expediently determined by measuring or simulating the process parameters. The advantage of this is that the process parameters can be made available in different ways, which can, for example, lead to savings in measuring and control technology when simulating the process parameters.

According to a further embodiment of the method, the measurement of the process parameters is carried out as an inline measurement and/or atline measurement and/or online measurement, whereby the process parameters are expediently measured at a process parameter sampling frequency. The method for controlling the particle-forming fluidization process taking place in the fluidizing apparatus with regard to at least one product property of the process material thus always has access to the actual process parameters for the control.

According to a further development of the method, the process parameter actual values determined at the first time form a process parameter set. This is to facilitate the forwarding of the process parameter actual values to the control device. In this respect, each of the optimization parameter sets is formed from the plurality of process parameter optimization values corresponding to the plurality of process parameter actual values of the process parameter set, at least one process parameter optimization value substituting a corresponding process parameter actual value in the optimization parameter set.

Furthermore, each of the process parameter optimization values can assume any optimization value, the optimization value preferably being selectable from a plurality of predetermined optimization values. This limits the plurality of optimization parameter sets to a number resulting from any combination of process parameters and the plurality of predetermined optimization values of the respective process parameter. With expediently the same number of the plurality of predetermined optimization values for each process parameter optimization value, the maximum number of process parameter optimization sets results in "number of process parameter optimization values to the power of the plurality of predetermined optimization values". In principle, the plurality of predefined optimization values can be any number, whereby the number of optimization parameter sets and thus also the number of optimization values is expediently determined by the computing time required for the optimization model in the control device. The more powerful the control device is, the more optimization values and process parameter optimization values can be used. In addition, a correspondingly high number of optimization values and process parameter optimization values also has an effect on the accuracy of the control of the fluidization process.

Advantageously, the predetermined optimization values are based on the respective process parameter actual values. The optimization values represent the widest possible range of values within the technological limits of the fluidization process. Optimization values that lead to instabilities in the fluidization process are no longer within the technological limits of the fluidization process. The technological and product-specific limits of the fluidization process in relation to the respective process parameters are usually determined in preliminary tests associated with the fluidization process.

According to an additional embodiment of the method, a first time interval comprising at least one time step is between the first time and the second time, and a second time interval comprising at least one time step is between the second time and the third time. In this respect, the first time interval and the second time interval have a different number of time steps, the first time interval expediently having a single time step. In preliminary tests in this regard, it has been shown that the first time interval advantageously has one time step and the second time interval has 19 time steps. This means that there are 20 time steps between the first and the third time. However, the time interval between the first and the third time can also be directed further into the future and have a number of, for example, 30, 40, 50 or more time steps. The second time interval is to be set accordingly. Expediently, the number of time steps of the first and second time intervals will be adapted to each other. However, the number of time steps of the first and second time intervals remains freely selectable for the respective individual fluidization process.

According to a further development of the method, a target value function is stored in the control device for each product property to be controlled. Expediently, a target value function stored in the control device for each product property to be controlled maps the desired course of the respective product property to be controlled over time. In the case of particle size as the selected product property to be controlled, the target value function maps the particle growth over time, for example.

According to a further development of the method, the target value function for the at least one product property to be controlled is generated from experimental data or from a target value process model. This will be used to adapt the target value function to the physico-chemical principles applicable to the particle-forming fluidization process. Furthermore, the method also allows the target value function to be any function specified by an operator and stored in the control device.

In this respect, the target value process model is expediently based on a kinetic model of the at least one product property. A kinetic model refers to the mathematical description of the course of the product property of each at least one product property to be controlled in the fluidization process as a function of different process parameters, such as, for example, growth kinetics of the particle size. Preferably, in the method, the at least one product property is the particle size and/or the particle moisture and/or the particle composition. The use of a kinetic model also adapts the target value function to the physico-chemical principles applicable to the particle-forming fluidization process.

According to a further embodiment of the method, the at least one product property to be controlled is detected as a product property measured at a first time and forwarded to the control device as a product property actual value. In this respect, the product property actual values are smoothed by means of a mathematical smoothing method, expediently by means of the Whittaker-Henderson method. In addition, the product property actual values form a product property set. This facilitates the forwarding of the product property actual values to the control device.

Expediently, the correction value is calculated at the first time by subtracting the process model product property value of the at least one product property calculated for the at least one product property at the first time from the at least one product property actual value detected at the first time. By calculating the correction value in this way, the error calculated by the process model at each time step and accumulating over time is corrected. Preferably, the correction value at the first time is "0", since no product property actual value is detected at the first time in the first process cycle.

Preferably, the detection of the product properties is carried out as an inline measurement and/or atline measurement and/or online measurement, whereby expediently the product property is detected with a product property sampling frequency. The method for controlling the particle-forming fluidization process taking place in the fluidizing apparatus with regard to at least one product property of the process material thus always has access to the actual product properties for control purposes.

In a further preferred embodiment of the method, the process parameter sampling frequency and the product property sampling frequency have the same value. This ensures that the current process parameter actual values and the current product property actual values are provided at the same time in a process cycle or at one time.

Furthermore, a product property set is formed once there are two or more product properties to be controlled, the product properties to be controlled being prioritized with respect to a priority control of one of the product properties. The prioritization of the product properties to be controlled, also referred to as the weighting of the product properties to be controlled, is carried out according to the importance of the respective product property in the fluidization process and/or for the product quality and/or the user requirements. If, for example, the particle moisture to be achieved in the process material is of greater importance in a fluidization process than the particle size of the process material, then the particle moisture must be prioritized or weighted accordingly. The prioritization means that an optimization difference value of the prioritized product property is to be achieved with priority compared to a less prioritized product property. For example, the optimization difference values of the product properties to be controlled in an optimization parameter set are added together, whereby each optimization difference value is multiplied by a weighting factor according to its prioritization and thus weighted. The sum of the optimization difference values can then be divided by the number of optimization difference values. In one example, the process parameter optimization values of the lowest sum or the lowest average of the optimization parameter set associated with the optimization difference values are then output as command variables.

According to a further development of the method, the optimization model is based on the process model, in particular the optimization model corresponds to the process model. An optimization model corresponding to the process model ensures that the plurality of optimization forecast values calculated at a third time by means of the optimization model have the same basis as the process model product property value calculated at the first time by means of the process model. Thus, improved control of the at least one product property to be controlled can be achieved.

According to a further additional embodiment of the method, the process model for calculating the process model product property value is based on a linear or non-linear process model of the fluidization process to be controlled, wherein an artificial neural network is expediently used as the non-linear process model. In this respect, the artificial neural network is designed in particular as a multilayer perceptron or as a simple recurrent network, such as an ELMAN network, or as a non-linear autoregressive exogenous network, such as a NARX network. The artificial neural networks are expediently trained before carrying out the method for controlling a particle-forming fluidization process taking place in a fluidizing apparatus with regard to at least one product property of a process material by means of experiments carried out in a fluidizing apparatus, wherein different process parameters are varied in each of the experiments carried out with regard to the at least one product property to be controlled.

Preferably, one or more process parameters from the group of spray gas pressure and/or spray rate and/or spray quantity and/or particle temperature and/or drying gas temperature at the inlet of the fluidizing apparatus and/or the relative humidity of the drying gas at the outlet and/or drying gas volume flow are used as process parameters.

BRIEF DESCRIPTION OF THE DRAWINGS

The terms Fig., Figs., Figure, and Figures are used interchangeably in the specification to refer to the corresponding figures in the drawings.

In the following, the invention is described in more detail with reference to the enclosed drawing, in which it is shown FIG. 1 a schematic illustration of the method for controlling a particle-forming fluidization process taking place in a fluidizing apparatus with respect to at least one product property of a process material, FIG. 2 a diagram showing a product property plotted over time in the first process cycle and detailed sections A and B, FIG. 3 an enlarged view of detail section A, FIG. 4 an enlarged view of detail section B, FIG. 5 a diagram showing a product property plotted over time in the second process cycle and detailed sections C and D, FIG. 6 an enlarged view of detail section C and FIG. 7 an enlarged view of detail section D.

DETAILED DESCRIPTION OF PREFERRED EMBODIMENTS

Figure 1:
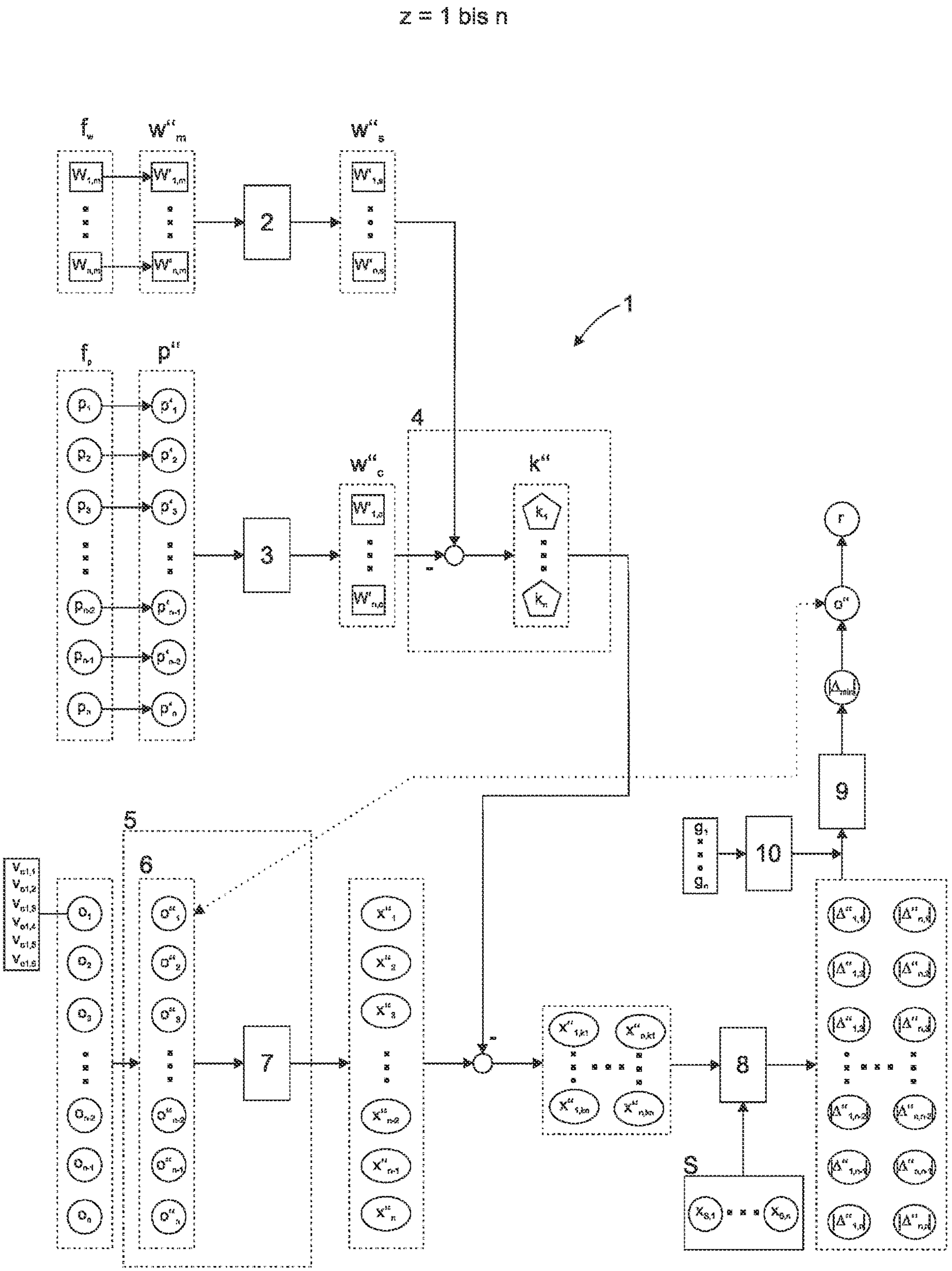

Unless otherwise specified, the following description refers to all embodiments illustrated in the drawing of a method for controlling a particle-forming fluidization process taking place in a fluidizing apparatus with regard to at least one product property w of a process material.

The indices n used in the description refer to any natural number, whereby n can take on different values for different letters. For example, n=3 for $o_n$ and n=27 for $o''_n$.

In a process cycle z, the sequence of which is explained below with reference to the embodiment shown in FIG. 1, a plurality of process parameters p of the fluidization process are determined at a first time $t_1$. The first time $t_1$ is to be understood as the actual time t of the fluidization process. Among other things, the spray gas pressure and/or the spray rate and/or the spray quantity and/or the particle temperature and/or the drying gas temperature at the inlet of the fluidizing apparatus and/or the relative humidity of the drying gas at the outlet and/or the drying gas volume flow can be used as process parameters p.

The process parameters p are determined by simulation or by measurement. The process parameters p are optionally measured as an inline measurement, atline measurement or online measurement with the use of a corresponding measuring and control technology known to the person skilled in the art. Expediently, the process parameters p are measured with a process parameter sampling frequency $f_p$. The determined process parameters p are forwarded as process parameter actual values p' to a control device 1 having a control functionality. The process parameter actual values p' determined at the first time $t_1$ preferably form a process parameter set p". In an embodiment not shown, some of the process parameters p will have been simulated, while the other part of the process parameters p have been measured.

Parallel to the measurement and/or simulation of the process parameters p, at least one product property $w_m$ is also measured at the first time $t_1$ with a product property sampling frequency $f_w$. Expediently, the measurement is optionally performed as an inline measurement, atline measurement or online measurement. The at least one product property w to be controlled is detected as a product property actual value $w'_m$ measured at a first time $t_1$ and forwarded to the control device 1. Expediently, the product property actual values $w'_m$ form a product property set $w''_m$. Among other things, the particle size and/or the particle moisture and/or the particle composition are used as product properties.

It is particularly preferable for the process parameter sampling frequency $f_p$ and the product property sampling frequency $f_w$ to have the same value. This means that the process parameter actual values p' and the product property actual values $w'_m$ are available in the control device 1 at the same time.

In the control device 1, the forwarded product property actual values $w'_m$ are smoothed in a smoothing module 2 assigned to the control device 1 using a mathematical smoothing method. Expediently, this is performed using a mathematical smoothing method such as the Whittaker-Henderson method. The mathematically smoothed product property values $w'_s$ then form in particular a product property value size set $w''_s$.

The control device 1 also comprises a process model module 3, in which a process model product property value $w'_c$ is calculated for a second time $t_2$ following the first time $t_1$ on the basis of a process model stored for the at least one product property w with the detected process parameter actual values p', which preferably form a process parameter set p". The process model product property values $w'_c$ expediently form a process model product property value size set $w''_c$.

The process model for calculating the corresponding process model product property value $w'_c$ is based on a linear or non-linear process model of the fluidization process to be controlled, wherein an artificial neural network is expediently used as the non-linear process model. The artificial neural network is preferably designed as a multi-layer perceptron or as a simple recurrent network or as a non-linear autoregressive exogenous network. The artificial neural networks are expediently trained before carrying out the method for controlling a particle-forming fluidization process taking place in a fluidizing apparatus with regard to at least one product property of a process material by means of experiments carried out in a fluidizing apparatus, in each case varying different process parameters p with regard to the at least one product property w to be controlled in the experiments carried out.

Furthermore, the control device 1 comprises a correction module 4. In the correction module 4, a correction value k is calculated at the first time $t_1$. The correction value k is calculated for each product property w to be controlled by subtracting the process model product property value $w'_c$ of the at least one product property w calculated for the at least one product property w at the first time $t_1$ from the at least one product property actual value $w'_m$, preferably the mathematically smoothed product property actual value $w'_s$, detected at the first time $t_1$. The correction values k can also form a correction value set k". In the first process cycle $z_1$, the respective correction values k are set to the value "zero" due to the missing process model product property value $w'_c$ at the first time $t_1$.

Moreover, before the start of the method for controlling a particle-forming fluidization process taking place in a fluidizing apparatus, optimization values v are specified with regard to at least one product property w of a process material on the basis of an expected range of validity of the process parameters p. By range of validity is meant here, for example, a specific range of validity for the particle temperature serving as the process parameter optimization value o, namely, for example, from 75° C. to 100° C., with the optimization values v informing the range of validity in particular equidistantly, for example in parts having six values, here as values thus $v_1$=75° C., $v_2$=80° C., $v_3$=85° C., $v_4$=90° C., $v_5$=95° C. and $v_6$=100° C.

Generally speaking, each of the process parameter optimization values o can assume any optimization value v, wherein the optimization value v can be selected from a plurality of predetermined optimization values v. The plurality of optimization values v expediently ranges from two optimization values to n optimization values. In FIG. 1, the optimization values vo1 for the process parameter optimization value o1 are shown as an example for all optimization values v. In the embodiment shown, the process parameter optimization value $o_1$ has six optimization values $v_{o1,1}$ to $v_{o1,6}$. Expediently, but not necessarily, all process parameter optimization values o comprise the same number of optimization values v.

The control device 1 also comprises an optimization module 5. In the next step, each of the optimization parameter sets o" is formed in a combinatorics module 6 assigned to the optimization module 5 from the plurality of process parameter actual values p' of the process parameter set p", wherein in the optimization parameter set o" at least one process parameter optimization value o is substituted for a corresponding process parameter actual value p'. In the combinatorics module 6, a number of $n^6$ process parameter optimization sets o" are therefore formed, for example, for n process parameter optimization values o and six optimization values $v_{o1,1}$ to $v_{o1,6}$. Specifically, this would result in a number of $3^6$=729 optimization parameter sets o" for three process parameter optimization values o with six optimization values v each. The number of optimization values v and the number of process parameter optimization values o depend in particular on the performance of the control device 1.

In addition, the optimization module 5 comprises an optimization model module 7. Using the determined optimization parameter sets o", a plurality of optimization forecast values x is calculated at a third time $t_3$ by means of an optimization model stored in the control device 1, expediently in the optimization model module 7. The plurality of optimization forecast values x corresponds to the number of optimization parameter sets o". The optimization model is preferably based on the process model, in particular the optimization model even corresponds to the process model.

In the next step, a correction value k is added to each of the optimization forecast values x to form a corrected optimization forecast value $x_k$. In the embodiment shown in FIG. 1, the correction value k is subtracted from the optimization forecast value x to form the corrected optimization forecast value $x_k$.

Subsequently, in a comparison module 8 assigned to the control device 1, an optimization difference value D is calculated at the third time $t_3$ from a comparison between each of the corrected optimization forecast values $x_k$ and a forecast target value $x_S$ for the at least one product property w determined at the third time $t_3$ from at least one target value function S stored in the control device 1. Preferably, a target value function S is stored in the control device 1 for each product property w to be controlled. The target value function S for the at least one product property w to be controlled is formed in particular from experimental data or from a target value process model. Expediently, kinetics of the product property, e.g. growth kinetics of the particle size, can be used to specify the setpoint $x_S$.

In the embodiment shown in FIG. 1, the optimization difference value D is formed as the absolute value of the subtraction of the corrected optimization forecast value $x_k$ and the target value $x_S$. In the embodiment shown, sets of values are considered in each case.

The control device 1 further comprises an evaluation module 9, in which the absolute values of the optimization difference values D are evaluated and compared with each other. The process parameter optimization values o of the optimization parameter set o" associated with the smallest absolute value of the optimization difference value D are then output as the command variable r for the second time $t_2$ subsequent to the first time $t_1$. The respective command variable r will then be fed to the fluidization process and adjusted by means of further control (P, PI, PID control) of the process parameters p.

Starting with a number of two product properties w to be controlled, a product property set w" is formed, wherein the product properties w to be controlled are prioritized in relation to a priority control. The product properties w to be controlled are prioritized according to the importance of the respective product property w in the fluidization process. If, for example, the product property of the particle size of the process material and the particle moisture of the process material is to be controlled in the fluidization process, wherein the particle moisture to be achieved in the process material is of greater importance than the particle size of the process material, then the particle moisture is to be prioritized or weighted accordingly. For this purpose, the control device 1 comprises a weighting module 10 in which the prioritization is performed.

The prioritization has the effect that a prioritized product property w is to be achieved with priority compared to a less prioritized product property w. For this purpose, for example, the absolute values of the optimization difference values D of the product properties w to be controlled are added together, and each absolute value of the optimization difference values D is weighted during addition according to its prioritization, e.g. multiplied by its weighting factor g. The sum of the optimization difference values can then be divided by the number of optimization difference values. In one example, process parameter optimization values o of the lowest sum of the absolute value of the optimization difference values D associated with the optimization parameter set o" are output as command variables.

Zwischen dem ersten Zeitpunkt $t_1$ und zweiten Zeitpunkt $t_2$ liegt eine wenigstens einen Zeitschritt d aufweisende erste Zeitspanne $\Delta t_1$ und zwischen dem zweiten Zeitpunkt $t_2$ und dritten Zeitpunkt $t_3$ eine wenigstens einen Zeitschritt d aufweisende zweite Zeitspanne $\Delta t_2$. Die erste Zeitspanne $\Delta t_1$ und die zweite Zeitspanne $\Delta t_2$ weisen eine bevorzugt unterschiedliche Anzahl an Zeitschritten d auf, wobei die erste Zeitspanne $\Delta t_1$ zweckmäßigerweise einen einzigen Zeitschritt d aufweist.

A first time interval $\Delta t_1$ comprising at least one time step d is between the first time $t_1$ and the second time $t_2$, and a second time interval $\Delta t_2$ comprising at least one time step d is between the second time $t_2$ and the third time $t_3$. The first time interval $\Delta t_1$ and the second time interval $\Delta t_2$ preferably have a different number of time steps d, with the first time interval $\Delta t_1$ expediently having a single time step d.

A plurality of process cycles z can run sequentially, with the second time $t_2$ of the previous process cycle z forming the first time $t_1$ of the subsequent process cycle z+1.

Figure 2:
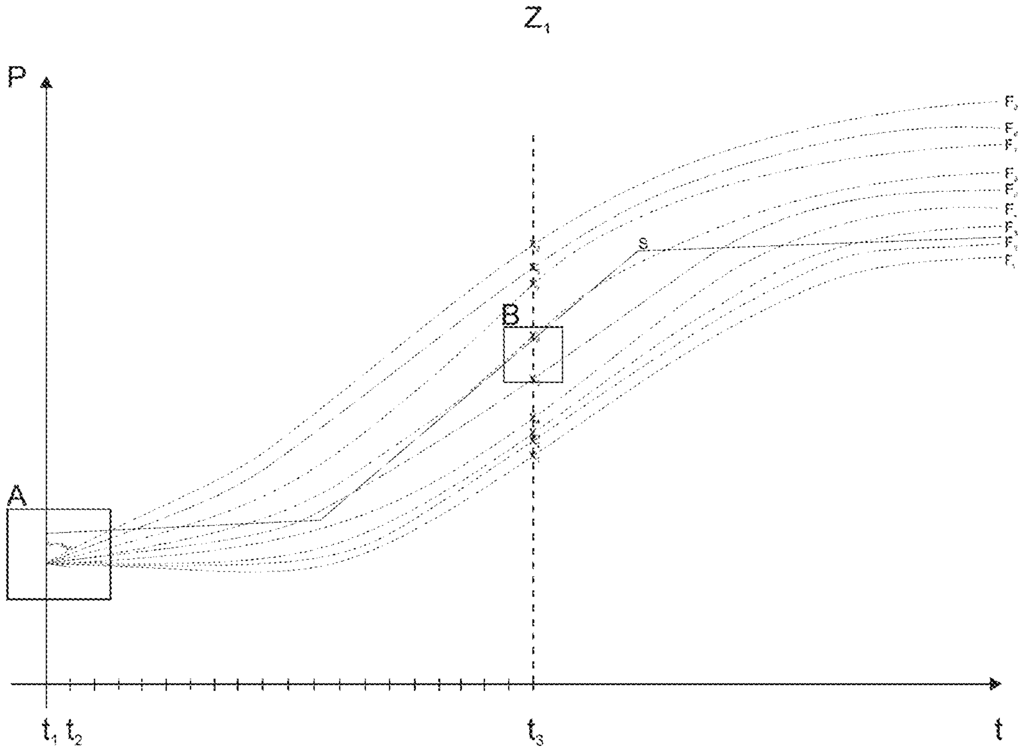

FIG. 2 shows a diagram with a plot of a product property w plotted over time t in the first process cycle z1 and detailed sections A and B.

In the embodiment, control was based on a product property w, wherein the particle size was selected as the product property w.

For the control itself, three process parameters p were used in the embodiment shown. The spray gas pressure was used as process parameter $p_1$, the spray rate as process parameter $p_2$ and the particle temperature as process parameter $p_3$. Each process parameter p could only assume two optimization values v.

There is a time interval $\Delta t_1$ of one time step d between the first time $t_1$ and the second time $t_2$ and a time interval $\Delta t_2$ of 19 time steps d between the first time $t_2$ and the third time $t_3$. This means that there are 20 time steps d between the first time $t_1$ and the third time $t_3$.

Also shown is the target value function S for the particle size as product property w.

In combinatorics module 6, a number of $3^2$ optimization parameter sets o" are formed for 3 process parameter optimization values o and two optimization values v in each case. Specifically, nine optimization parameter sets o" are therefore formed in combinatorics module 6. The nine functions resulting from the optimization model with the respective optimization parameter sets o" are marked F1 to $F_9$ in the diagram.

The optimization forecast values $x_1$ to $x_9$ are the function values of the nine functions $F_1$ to $F_9$ at the third time $t_3$.

Figure 3:
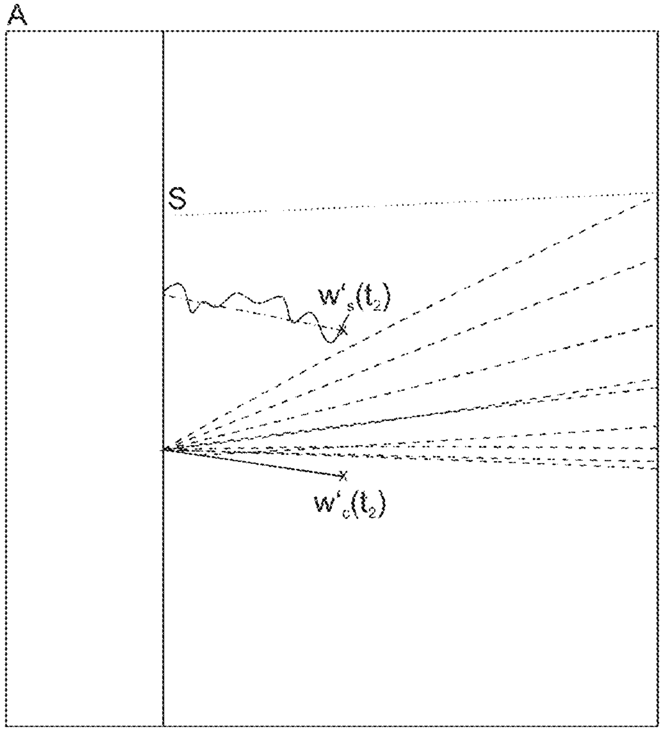

In detailed section A of FIG. 3, the course of the measured and smoothed product property actual values $w'_m$ and $w'_s$ is shown. The smoothed product property actual value $w'_s$ at time $t_2$ is also shown. Furthermore, the product property actual value $w'_c$ calculated using the process model at the second time $t_2$ is shown.

Figure 4:
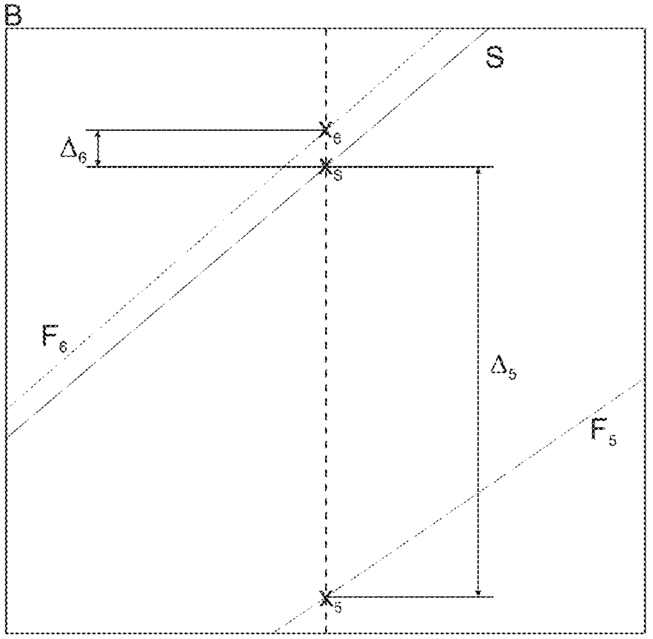

Detailed section B of FIG. 4 shows the functions $F_5$ and $F_6$ in enlarged form and the optimization forecast values $x_5$ to $x_6$ at time $t_3$. The two functions $F_5$ and $F_6$ are closest to the target value xS of the target value function S at time $t_3$.

The correction value k is calculated for the product property w to be controlled by subtracting the process model product property value $w'_c$ of the product property w calculated for the product property w at the first time $t_1$ from the mathematically smoothed product property actual value $w'_s$ at the first time $t_1$. Since the respective correction value k cannot be calculated in the first process cycle $z_1$ due to the missing process model product property value $w'_c$ at the first time $t_1$, the correction value k is set to the value “zero” in the first process cycle $z_1$.

In the embodiment shown in FIG. 4, the optimization forecast value $x_5$ or $x_6$ is subtracted from the target value $x_S$ to form the optimization difference values $\Delta_5$ and $\Delta_6$. A comparison of the two absolute values of the optimization difference values $\Delta_5$ and $\Delta_6$ shows that the absolute value of the optimization difference value $\Delta_6$ is smaller than the absolute value of the optimization difference value $\Delta_5$. Thus, the process parameter optimization values o of the optimization parameter set o"6 associated with the optimization difference values $\Delta_6$ are output as command variables r for the next time $t_2$.

Figure 5:
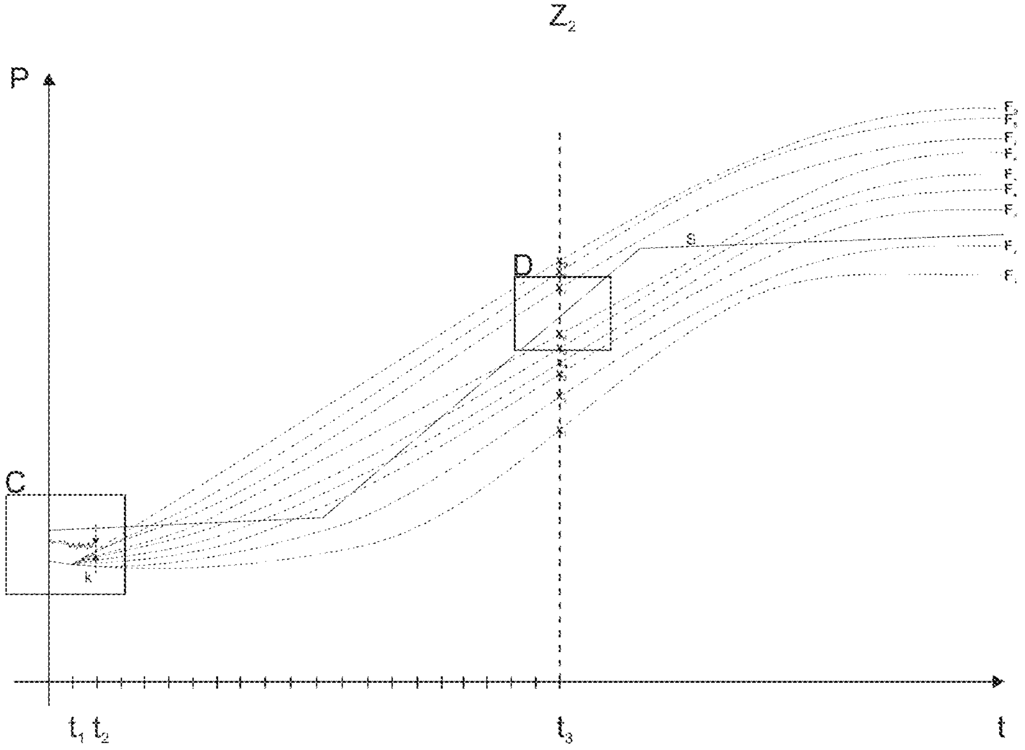
Figure 6:
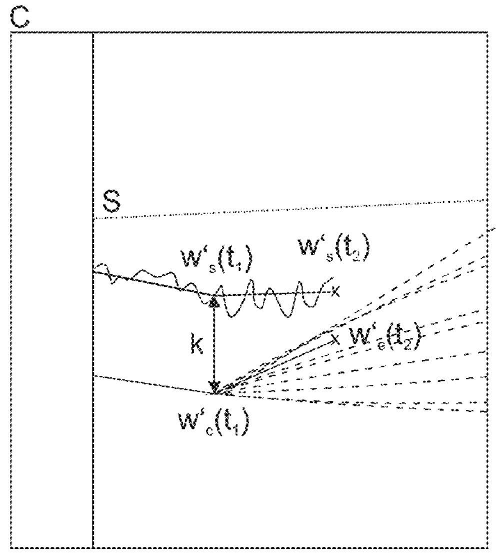
Figure 7:
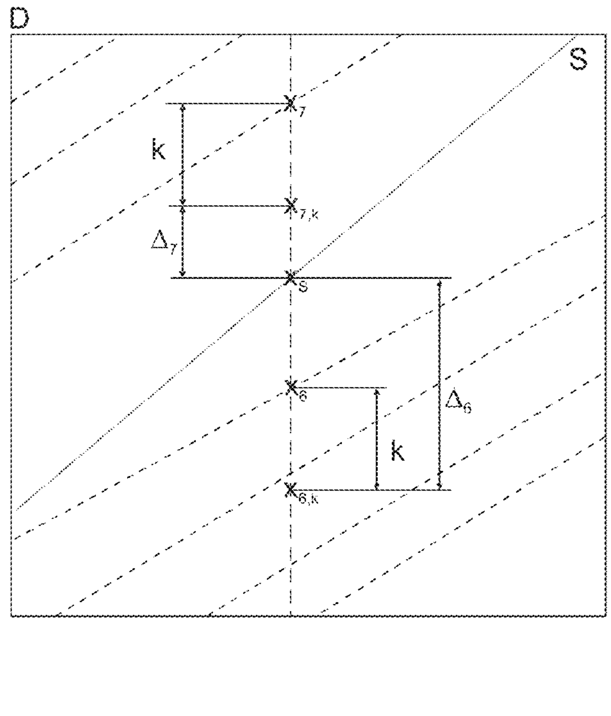

FIGS. 5 to 7 describe the same as FIGS. 2 to 4, but for the second process cycle $z_2$.

FIG. 5 shows a schematic illustration of a second process cycle $z_2$ of the exemplary embodiment with a product property w plotted over time t and in detailed sections C and D.

The product property actual value $w'_s$ and process model product property value $w'_c$ available at the second time $t_2$ of the process cycle z form the product property actual value $w'_s$ and process model product property value $w'_c$ of the first time $t_1$ in the subsequent process cycle $z_{+1}$.

Between the first time $t_1$ and the second time $t_2$ there is also a time interval $\Delta t_1$ comprising one time step d and between the second time $t_2$ and the third time $t_3$ there is a time interval $\Delta t_2$ comprising 19 time steps d. Thus, as in the first process cycle $z_1$, there are 20 time steps d between the first time $t_1$ and the third time $t_3$.

The target value function S for the particle size as product property w is also shown.

In combinatorics module 6, a number of $3^2$ optimization parameter sets o" are formed for the 3 process parameter optimization values o and the two optimization values v in each case. Specifically, nine optimization parameter sets o" are therefore formed in combinatorics module 6. The nine functions resulting from the optimization model with the respective optimization parameter sets o" are marked $F_1$ to $F_9$ in the diagram.

The optimization forecast values $x_1$ to $x_9$ are the function values of the nine functions $F_1$ to $F_9$ at the third time $t_3$.

In detailed section C of FIG. 6, the course of the measured and smoothed product property actual value $w'_m$ and $w'_s$ is shown. The smoothed product property actual value $w'_s$ at time $t_2$ is also shown. Furthermore, the product property actual value $w'_c$ calculated using the process model at the second time $t_2$ is shown.

The detailed section D of FIG. 7 shows the functions $F_6$ and $F_7$ in enlarged form and the optimization forecast values $x_6$ to $x_7$ at time $t_3$. The two functions $F_6$ and $F_7$ are closest to the target value $x_S$ of the target value function S at time $t_3$.

The correction value k is calculated for the product property w to be controlled by subtracting the process model product property value $w'_{c(t1)}$ of the product property w calculated for the product property w at the first time $t_1$ from the mathematically smoothed product property actual value $w'_{s(t1)}$ at the first time $t_1$.

In the embodiment shown in FIG. 7, the correction value k is subtracted from the optimization forecast value $x_6$ or $x_7$ and then the target value $x_S$ is subtracted from the corrected optimization forecast value $x_{6,k}$ or $x_{7,k}$ to form the optimization difference values $\Delta_6$ and $\Delta_7$. A comparison of the two absolute values of the optimization difference values $\Delta_6$ and $\Delta_7$ shows that the absolute value of the optimization difference value $\Delta_7$ is smaller than the absolute value of the optimization difference value $\Delta_6$. Thus, the process parameter optimization values o of the optimization parameter set $o''_7$ associated with the optimization difference value $\Delta_7$ are output as command variables r for the next time $t_2$.

The invention claimed is:

1. A method for controlling a particle-forming fluidization process taking place in a fluidization apparatus with regard to at least one product property of a process material, comprising:

in a process cycle, a plurality of process parameters of the fluidization process are determined at a first time, which are forwarded as process parameter actual values to a control device having a control functionality, a process model product property value for a second time subsequent to the first time is calculated in the control device using the process parameter actual values on the basis of a process model stored for the at least one product property, and a plurality of optimization parameter sets are generated in the control device from a plurality of process parameter optimization values provided, using which a plurality of optimization forecast values is calculated at a third time by means of an optimization model, wherein a correction value is added to each of the optimization forecast values to form a corrected optimization forecast value, and wherein an optimization difference value is calculated at a third time from a comparison between each of the corrected optimization forecast values and a forecast target value for the at least one product property determined at the third time from a target value function stored in the control device, and wherein subsequently the process parameter optimization values of the optimization parameter set associated with the smallest absolute value of the optimization difference value are each output as a command variable for the second time subsequent to the first time.

2. The method according to claim 1, wherein a plurality of process cycles run one after the other, the second time of the process cycle in each case becoming the first time of the subsequent process cycle.

3. The method according to claim 1, wherein process parameters are determined by measurement or simulation.

4. The method according to claim 1, wherein the process parameter actual values determined at the first time form a process parameter set.

5. The method according to claim 4, wherein each of the optimization parameter sets is formed from the plurality of process parameter optimization values corresponding to the plurality of process parameter actual values of the process parameter set, at least one process parameter optimization value substituting a corresponding process parameter actual value in the optimization parameter set.

6. The method according to claim 4, wherein each of the process parameter optimization values can assume any optimization value, the optimization value being selectable from a plurality of predetermined optimization values.

7. The method according to claim 6, wherein the predetermined optimization values are based on the respective process parameter actual values.

8. The method according to claim 6, wherein a first time interval comprising at least one time step is between the first time and the second time, and a second time interval comprising at least one time step is between the second time and the third time.

9. The method according to claim 8, wherein the first time interval and the second time interval have a different number of time steps, the first time interval expediently having a single time step.

10. The method according to claim 1, wherein a target value function is stored in the control device for each product property to be controlled.

11. The method according to claim 10, wherein the target value function for the at least one product property to be controlled is generated from experimental data or from a target value process model.

12. The method according to claim 11, wherein the target value process model is based on a kinetic model of the at least one product property.

13. The method according to claim 1, wherein the at least one product property to be controlled is detected as a product property-measured at a first time and is forwarded to the control device as a product property actual value.

14. The method according to claim 13, wherein the detected product property actual values are smoothed by means of a smoothing method, expediently by means of the Whittaker-Henderson method.

15. The method according to claim 13, wherein the product property actual values form a product property set.

16. The method according to claim 13, wherein the correction value is calculated at the first time by subtracting the process model product property value of the at least one product property calculated for the at least one product property at the first time from the at least one product property actual value detected at the first time.

17. The method according to claim 1, wherein a product property set is formed once there are two or more product properties to be controlled, the product properties to be controlled being prioritized with respect to a priority control of one of the product properties.

18. The method according to claim 1, wherein the at least one product property is one or more of: the particle size, the particle moisture, and/or the particle composition.

19. The method according to claim 1, wherein the optimization model corresponds to the process model.

20. The method according to claim 1, wherein the process model for calculating the process model product property value is based on a linear or non-linear process model of the fluidization process to be controlled, wherein an artificial neural network is expediently used as the non-linear process model.

* * * * *